US008612829B2

(12) United States Patent
Kimura

(10) Patent No.: US 8,612,829 B2
(45) Date of Patent: Dec. 17, 2013

(54) COMMUNICATION APPARATUS

(75) Inventor: Kenji Kimura, Yamato koriyama (JP)

(73) Assignee: Shimadzu Corporation, Kyoto (JP)

(*) Notice: Subject to any disclaimer, the term of this patent is extended or adjusted under 35 U.S.C. 154(b) by 249 days.

(21) Appl. No.: 13/130,535

(22) PCT Filed: Nov. 27, 2008

(86) PCT No.: PCT/JP2008/071561
§ 371 (c)(1),
(2), (4) Date: May 20, 2011

(87) PCT Pub. No.: WO2010/061460
PCT Pub. Date: Jun. 3, 2010

(65) Prior Publication Data
US 2011/0225478 A1 Sep. 15, 2011

(51) Int. Cl.
*G11C 29/00* (2006.01)
*H03M 13/00* (2006.01)
*G06F 7/02* (2006.01)
*G06F 11/00* (2006.01)

(52) U.S. Cl.
USPC .............................. 714/763; 714/821; 714/56

(58) Field of Classification Search
USPC ......... 714/712, 745, 763, 704, 709, 746, 751, 714/752, 753, 755, 759, 766, 814, 815, 819, 714/821, 43, 48, 52, 55, 56
See application file for complete search history.

(56) References Cited

U.S. PATENT DOCUMENTS

| 5,655,076 | A | * | 8/1997 | Kimura et al. | 714/56 |
| 6,163,861 | A | * | 12/2000 | Yoshioka et al. | 714/712 |
| 7,530,001 | B2 | * | 5/2009 | Naoi | 714/748 |
| 2008/0056173 | A1 | | 3/2008 | Watanabe | |

FOREIGN PATENT DOCUMENTS

| CN | 101137091 A | 3/2008 |
| JP | 11-234174 A | 8/1999 |
| JP | 2004-159250 A | 6/2004 |

OTHER PUBLICATIONS

Notification of Reasons for Refusal for the Application No. 2010-540264 from Japan Patent Office mailed May 15, 2012.
The First Office Action for the Application No. 200880132026.4 from The State Intellectual Property Office of the People's Republic of China dated Mar. 28, 2013.

* cited by examiner

*Primary Examiner* — Christine Tu
(74) *Attorney, Agent, or Firm* — Cheng Law Group, PLLC

(57) ABSTRACT

A communicating unit used in an X-ray image pickup apparatus in this invention has an error detecting function to detect communication errors, and an FIFO for temporarily storing data received from a control and image processing apparatus, which is an external apparatus, by a receiving function of a communication control unit. Only when no error is detected within a predetermined period before and after receipt of data, by the receiving function of the communication control unit, from the control and image processing apparatus, a transmitting function of the communication control unit performs controls to transmit and write the data received and temporarily stored in the FIFO to/in an external portion. Thus, when a cable is plugged or unplugged or the control and image processing apparatus which is an external apparatus is rebooted, the error detecting function detects this as a communication error. In such cases also, an inadvertent writing of the data can be prevented. Therefore, a writing operation can be carried out also when there is no communication error. As a result, even if a communication error occurs, an inadvertent writing of data is prevented, and working efficiency is improved.

4 Claims, 8 Drawing Sheets

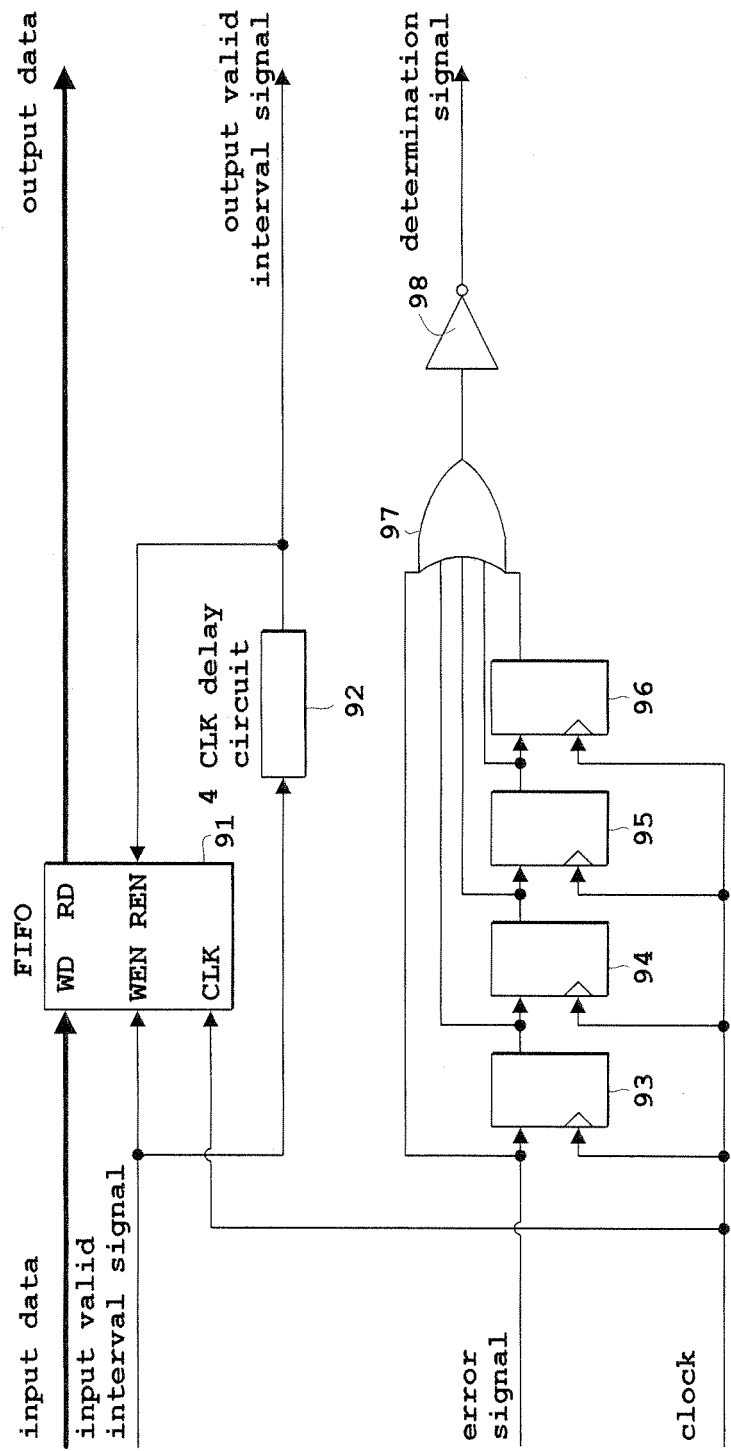

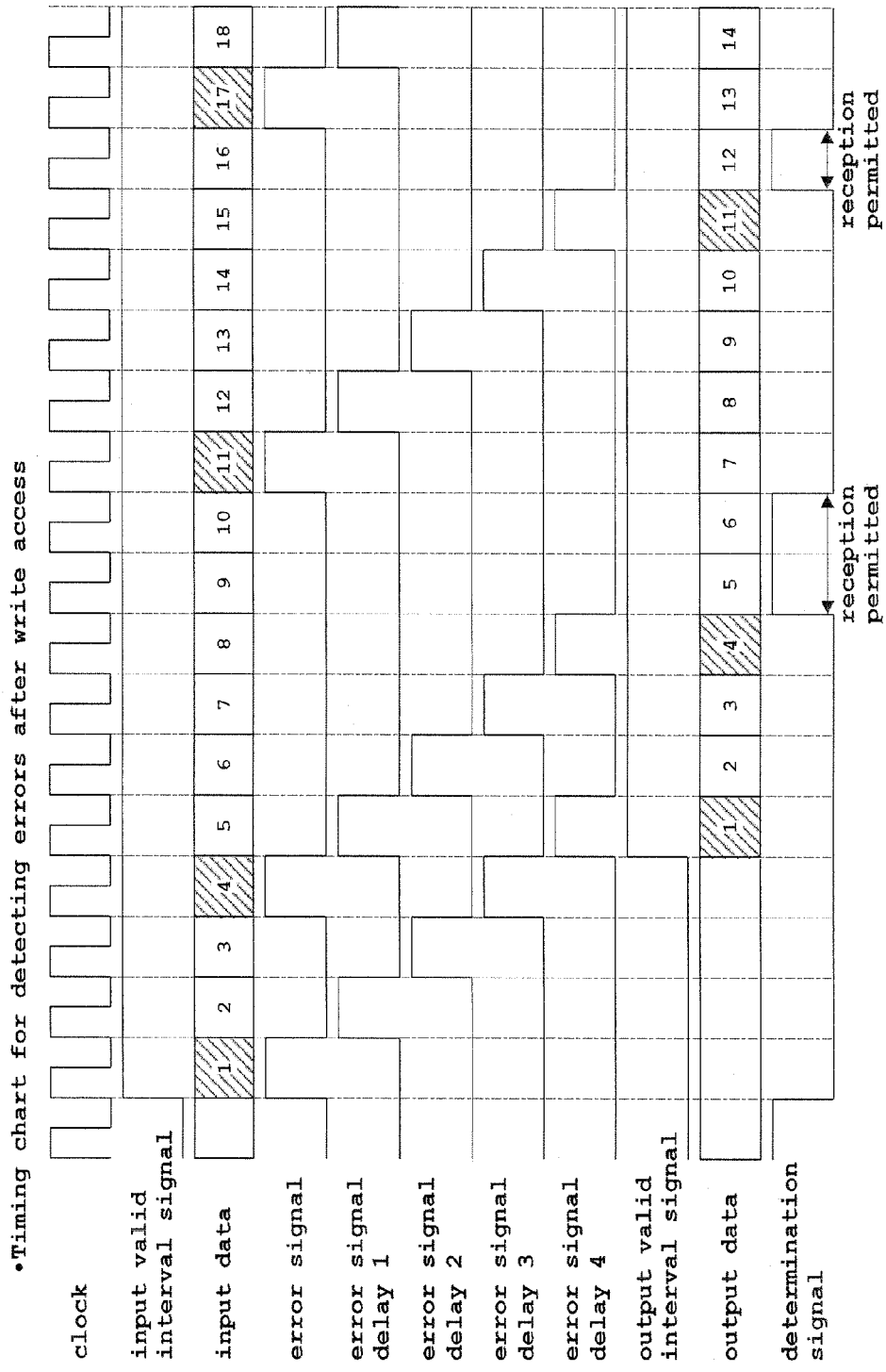

COMMUNICATION APPARATUS

TECHNICAL FIELD

This invention relates to a communication apparatus having a receiving device for receiving data from an external portion, and a transmitting device for transmitting data to the external portion.

BACKGROUND ART

A radiographic apparatus used in the medical field, industrial field or nuclear field will be described as an apparatus using the communication apparatus, X-rays will be described as an example of incident radiation, and an X-ray image pickup apparatus will be described as an example of radiographic apparatus.

An X-ray image pickup apparatus A1 is in form of a flat panel X-ray detector (FPD: Flat Panel Detector) which, as shown in FIG. 1, includes a gate drive circuit 1, a circuit 2 for detecting elements, charge-to-voltage converting amplifiers 3, an analog-to-digital converter 4, a panel control unit 5, an image correcting unit 6 and a communicating unit 7. In addition, an image buffer memory 8 is provided to store pixel values converted into digital values by the analog-to-digital converter 4, and the panel control unit 5 and image buffer memory 8 are electrically connected. Further, a parameter memory 9 is provided to store parameters used in image corrections by the image correcting unit 6, and the image correcting unit 6 and parameter memory 9 are electrically connected.

Arranged outside the X-ray image pickup apparatus A1, as shown in FIGS. 1 and 2, are an FPD power source A2 for driving the apparatus, and a control and image processing apparatus A3 as an external apparatus. As shown in FIG. 2, the control and image processing apparatus A3 has a communicating unit 11, an image processor 12 and a controller 13. The communicating unit 7 of the X-ray image pickup apparatus A1 and the communicating unit 11 of the control and image processing apparatus A3 are connected through an optical transmission device such as optical fiber F. Thus, the X-ray image pickup apparatus A1 is connected to be capable of communication to the control and image processing apparatus A3 which is an external apparatus. Optical fiber is suitable for transferring high-speed serial signals. The "serial signal" indicates a continuous transfer of each data, while the "parallel signal" described hereinafter indicates a simultaneous and parallel transfer of a plurality of data.

X-rays incident on the FPD are converted into electric charges (carriers) by an X-ray conversion layer 23 (see FIG. 3) formed of a semiconductor thick film such as of amorphous selenium, to be stored in capacitors Ca through corresponding detecting elements Du. The charges stored in the capacitors Ca are read under control of thin-film transistors Tr, converted into voltage and amplified by the charge-to-voltage converting amplifiers 3, and converted from analog voltage values into digital values by the analog-to-digital converter 4 connected downstream of the charge-to-voltage converting amplifiers 3 to be once stored as pixel values in the image buffer memory 8. Such processes are carried out on a pixel-by-pixel basis. The image correcting unit 6 reads, from the image buffer memory 8, pixel values resulting from these processes carried out for all pixels corresponding to the detecting elements Du and arranged for respective pixels (image), and performs calculations for image corrections (lag correction, offset correction and so on) based on parameters for the image corrections stored beforehand in the parameter memory 9. The results are transferred by the communicating unit 7 to the communicating unit 11 of the control and image processing apparatus A3. The series of these operations and the processes in the FPD is controlled by the panel controller 5.

In the control and image processing apparatus A3, the image processor 12 carries out image processing of the data received by the communicating unit 11. This apparatus carries out control of the entire FPD, and calculation and transmission of the parameters for image corrections used by the FPD. The calculation and transmission of the parameters for image corrections are carried out at a time of calibration (correction) which is, for example, after power-on of the FPD power source A2.

DISCLOSURE OF THE INVENTION

Problem to be Solved by the Invention

However, when a communication cable such as optical fiber is detached and attached, there arises a problem that the communication between the X-ray image pickup apparatus and the control and image processing apparatus becomes unstable. Therefore, the parameters in the FPD are rewritten inadvertently, requiring the parameters for image corrections to be written after carrying out initialization and calibration of the FPD again. When the control and image processing apparatus is rebooted (power source OFF/ON), and also when the FPD is started before the control and image processing apparatus, it is necessary to write the parameters for image corrections after carrying out initialization and calibration of the FPD again. The communication cable may be detached and attached without being noticed, and in particular the communication cable may become detached before anyone is aware of it. Since the X-ray image pickup apparatus A1 and control and image processing apparatus A3 are connected by optical fiber, the circuits within the X-ray image pickup apparatus A1 and control and image processing apparatus A3 can accommodate hot plugging (which means that the cable can be detached or attached in a power-on state). However, the system including the X-ray image pickup apparatus A1 and control and image processing apparatus A3 cannot accommodate hot plugging because of this problem.

This invention has been made having regard to the state of the art noted above, and its object is to provide a communication apparatus which, when a communication error occurs, prevents an inadvertent data transmission to an external portion, thereby to realize improved working efficiency.

Means for Solving the Problem

To fulfill the above object, this invention provides the following construction.

A communication apparatus of this invention has a receiving device for receiving data from an external portion, and a transmitting device for transmitting data to the external portion, the communication apparatus comprising an error detecting device for detecting a communication error, and a storage device for temporarily storing the data received from the external portion by the receiving device, wherein the transmitting device is arranged to perform controls to transmit the data received and temporarily stored in the storage device to the external portion, only when the error detecting device makes no detection within a predetermined period before and after receipt of the data from the external portion by the receiving device.

The communicating apparatus of this invention includes an error detecting device for detecting a communication error, and a storage device for temporarily storing data received from an external portion by the receiving device. The transmitting device performs controls to transmit the data received and temporarily stored in the storage device to the external portion, only when the error detecting device makes no detection within a predetermined period before and after receipt of the data from the external portion by the receiving device. Thus, when a cable is plugged or unplugged or an external apparatus is rebooted, for example, the error detecting device detects this as a communication error. In such cases also, an inadvertent transmission to the external portion of the data can be prevented. Therefore, an operation for transmission to the external portion (e.g. a writing operation) can be carried out without initialization and calibration, for example, also when there is no communication error (e.g. after communication is reinstated). As a result, even if a communication error occurs, an inadvertent data transmission to the external portion is prevented, and working efficiency is improved.

In the communicating apparatus of this invention, a communication error is detected when a redundancy is removed from the data having the redundancy to reinstate original data, particularly at a time of plugging or unplugging of a cable. By using this, the error detecting device detects the communication error based on reinstatement of the original data done by removing the redundancy from the data having the redundancy.

One example of the data having the redundancy is data with a bit number added to a bit number of the original data without the redundancy. It is possible to give the redundancy to the data by adding a bit number to the bit number of the original data.

The data having the redundancy is not limitative, and one example of data comprises differential signals. Differential signals are signals (also called "balance connection") made by dividing data into two signals, a signal of original data being allotted to one of the signals, and a signal of opposite phase having a reversed phase of the original data being allotted to the other signal. Where differential signals are employed, even if noise is superimposed on a signal, noise of opposite phase is superimposed in phase also on a signal of opposite phase, to cancel the noise components. Therefore, differential signals have an excellent noise-proof property. Differential signals are useful for reducing amplitude of the signals to speed up rises and falls of the signals for the purpose of high-speed transfer, or when the voltage of signals lowers due to an extended cable. On the other hand, the output of differential signals becomes indefinite when a cable is plugged or unplugged (particularly when the cable is detached). When respective signals of non-inversion (signals of original data) and inversion of the differential signals become indefinite at the same electric level, logic level will often change irregularly (randomly) to High and Low. Using such random changes, the error detecting device detects communication errors.

Effects of the Invention

The communication apparatus according to this invention includes an error detecting device for detecting a communication error, and a storage device for temporarily storing data received from an external portion by the receiving device. The transmitting device performs controls to transmit the data received and temporarily stored in the storage device to the external portion, only when the error detecting device makes no detection within a predetermined period before and after receipt of the data from the external portion by the receiving device. Thus, even if a communication error occurs, an inadvertent data transmission to the external portion is prevented, and working efficiency is improved.

BRIEF DESCRIPTION OF THE DRAWINGS

FIG. 8 is a logic circuit of an error detecting circuit for detecting errors (error signals) after a write access; and FIG. 9 is a timing chart for detecting errors after the write access.

DESCRIPTION OF REFERENCES

Figure 1:
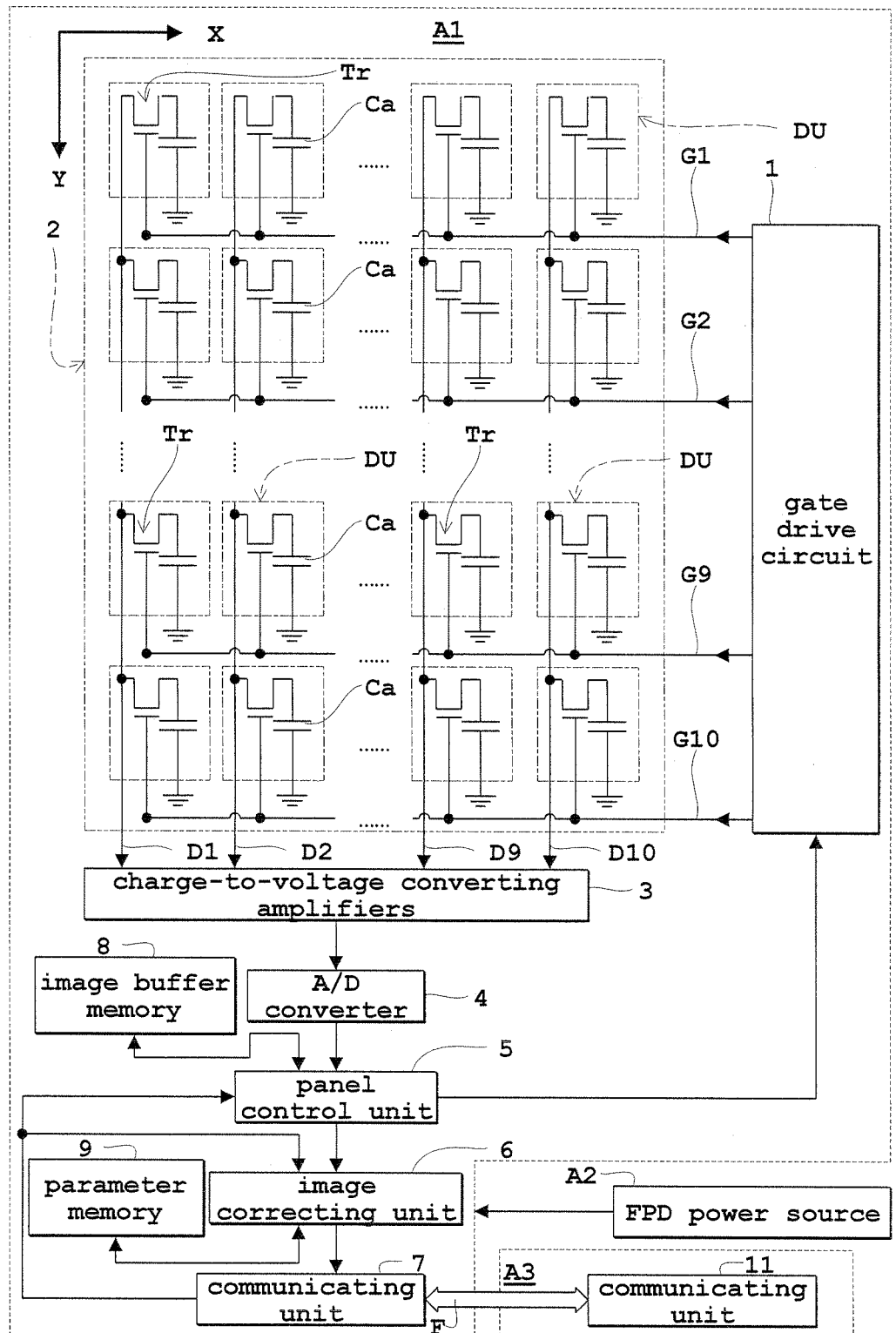
FIG. 1 is a schematic block diagram of an X-ray image pickup apparatus according to an embodiment.
Figure 2:
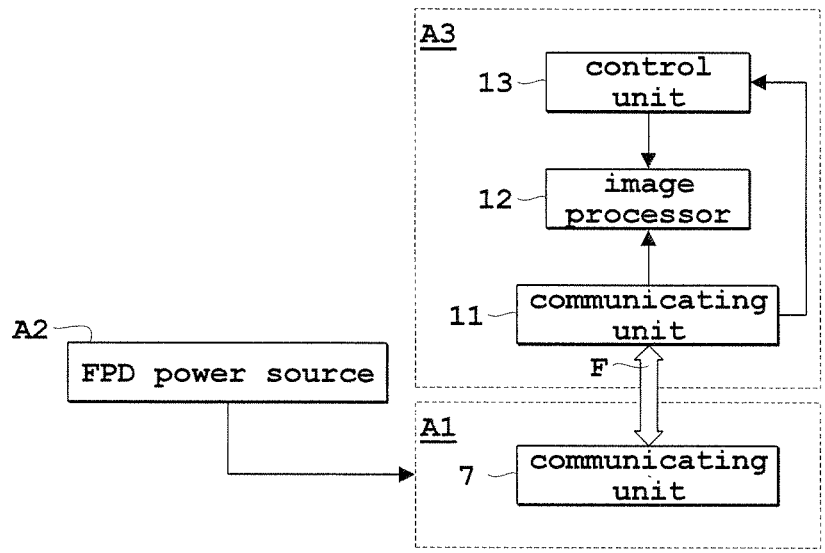
FIG. 2 is a schematic block diagram of an external apparatus (control and image processing apparatus) seen from the X-ray image pickup apparatus.
Figure 3:
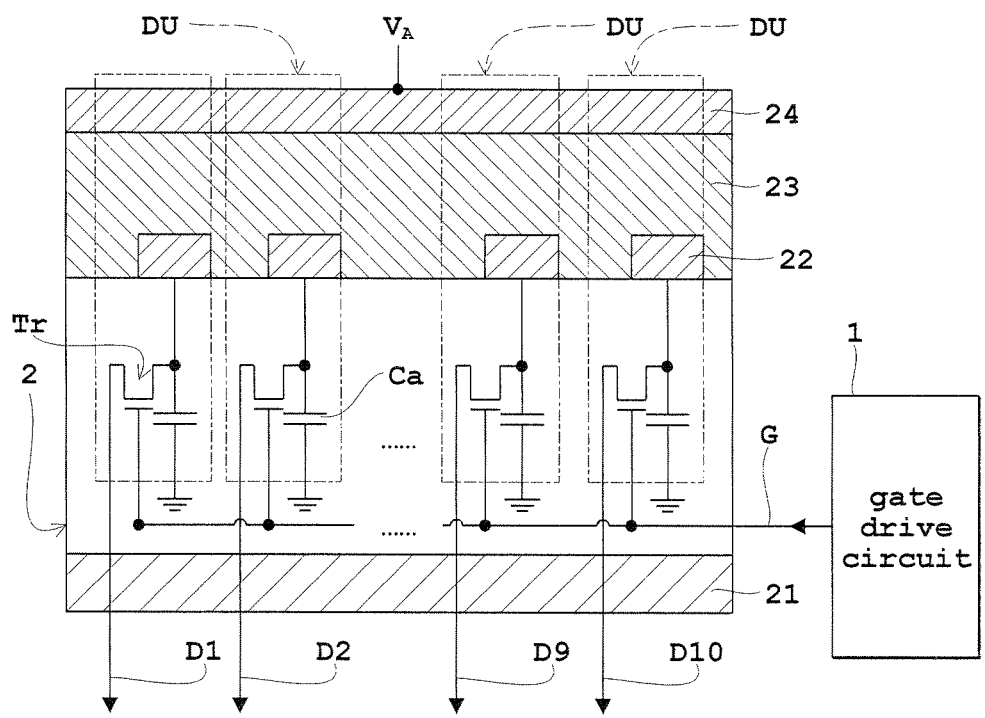
FIG. 3 is a schematic sectional view of an X-ray conversion layer and adjacent components of the X-ray image pickup apparatus.

7 . . . communicating unit
71 . . . communication control unit
74 . . . serial parallel conversion unit
91 . . . FIFO (First In First Out)
A1 . . . X-ray image pickup apparatus
A3 . . . control and image processing apparatus Embodiment An embodiment of this invention will be described hereinafter with reference to the drawings. FIG. 1 is a schematic block diagram of an X-ray image pickup apparatus according to an embodiment. FIG. 2 is a schematic block diagram of an external apparatus (control and image processing apparatus) seen from the X-ray image pickup apparatus. FIG. 3 is a schematic sectional view of an X-ray conversion layer and adjacent components of the X-ray image pickup apparatus. In this embodiment, a radiographic apparatus used in the medical field, industrial field or nuclear field will be described as an apparatus using a communication apparatus, X-rays will be described as an example of incident radiation, and an X-ray image pickup apparatus will be described as an example of radiographic apparatus.

The X-ray image pickup apparatus according to this embodiment picks up images of a subject by emitting X-rays thereto. Specifically, an X-ray image transmitted through the subject is projected to an X-ray conversion layer (amorphous selenium film in this embodiment), to generate in the layer carriers (charge information) proportional to density variations of the image, thereby to be converted into the carriers.

An X-ray image pickup apparatus A1 is in form of a flat panel X-ray detector (FPD) which, as shown in FIG. 1, includes a gate drive circuit 1 for selecting gate lines G to be described hereinafter, a circuit 2 for detecting elements for detecting X-rays by storing and reading carriers converted by an X-ray conversion layer 23 (see FIG. 3), charge-to-voltage converting amplifiers 3 for amplifying voltages converted from the carriers read from the circuit 2 for detecting elements, an analog-to-digital converter 4 for converting analog values of the voltages amplified by the charge-to-voltage converting amplifiers 3 into digital values, a panel control unit 5 for controlling a series of operations and processes in the FPD, an image correcting unit 6 for performing calculations for image corrections on the voltage values (pixel values) converted into digital values by the analog-to-digital converter 4, a communicating unit 7 for transmitting and receiving data to/from a communicating unit 11 of a control and image processing apparatus A3, an image buffer memory 8 for storing the pixel values converted into digital values by the analog-to-digital converter 4, and a parameter memory 9 for storing parameters used in the image corrections by the image correcting unit 6. The communicating unit 7 corresponds to the communication apparatus in this invention. As will be clear from this description, when seen from the communicating unit 7, the X-ray image pickup apparatus A1 excluding the communicating unit 7, and the control and image processing apparatus A3 to be described hereinafter, are external portions.

The gate drive circuit 1 is electrically connected to a plurality of gate lines G. By applying voltage to the respective gate lines G from the gate drive circuit 1, thin-film transistors (TFT) Tr to be described hereinafter are turned ON to open readout of the carriers stored in capacitors Ca to be described hereinafter. By stopping the voltage (setting the voltage to −10V) to the respective gate lines G, the thin-film transistors Tr are turned OFF to cut off the readout of the carriers. The thin-film transistors Tr may be constructed to turn OFF and cut off the readout of the carriers by applying voltage to the respective gate lines G, and to turn ON and open the readout of the carriers by stopping the voltage to the respective gate lines G.

The circuit 2 for detecting elements is formed of the plurality of gate lines G and data lines D arranged in two dimensions, and is formed also of a two-dimensional arrangement of the capacitors Ca for storing the carriers and the thin-film transistors Tr switchable ON/OFF for reading the carriers stored in the capacitors Ca. The gate lines G control ON/OFF switching of the respective thin-film transistors Tr, and are electrically connected to the gates of the respective thin-film transistors Tr. The data lines D are electrically connected to the readout sides of the thin-film transistors Tr.

For expediency of description, it is assumed that, in this embodiment, 10×10 thin-film transistors Tr and capacitors Ca are formed vertically and horizontally in a two-dimensional matrix arrangement. That is, the gate lines G consist of ten gate lines G1-G10, while the data lines D consist of ten data lines D1-D10. The gate lines G1-G10 are connected to the gates of ten thin-film transistors Tr juxtaposed in X-direction in FIG. 1, respectively, while the data lines D1-D10 are connected to the readout sides of ten thin-film transistors Tr juxtaposed in Y-direction in FIG. 1, respectively. The capacitors Ca are electrically connected to the sides opposite to the readout sides of the thin-film transistors Tr. The numbers of thin-film transistors Tr and capacitors Ca are in a one-to-one correspondence.

As shown in FIG. 3, the circuit 2 for detecting elements has detecting elements DU patterned in a two-dimensional matrix arrangement on an insulating substrate 21. That is, using a thin film forming technique by a varied vacuum evaporation method or a patterning technique by photolithography, the above gate lines G1-G10 and data lines D1-D10 are wired on a surface of the insulating substrate 21, and the thin-film transistors Tr, capacitors Ca, carrier collecting electrodes 22, X-ray conversion layer 23 and voltage application electrode 24 are laminated and formed in order.

The X-ray conversion layer 23 is formed of an X-ray sensitive semiconductor thick film and, in this embodiment, is formed of amorphous selenium (a—Se) film. The X-ray conversion layer 23, upon incidence of X-rays, converts information on the X-rays into carriers which constitute charge information. The X-ray conversion layer 23 is not limited to amorphous selenium as long as it is an X-ray sensitive material which generates carriers upon incidence of X radiation. When images are picked up upon incidence of radiation (e.g. gamma rays) other than X-rays, a radiation sensitive material which generates carriers upon incidence of the radiation may be used in place of the X-ray conversion layer 23. When images are picked up upon incidence of light, a light sensitive material which generates carriers upon incidence of light may be used in place of the X-ray conversion layer 23.

The carrier collecting electrodes 22 are electrically connected to the capacitors Ca for collecting the carriers converted by the X-ray conversion layer 23 to be stored in the capacitors Ca. These carrier collecting electrodes 22 are formed in a large number, vertically and horizontally in a two-dimensional matrix arrangement (10×10 in this embodiment), as are the thin-film transistors Tr and capacitors Ca. These carrier collecting electrodes 22, capacitors Ca and thin-film transistors Tr are separately formed as the detecting elements DU, respectively. The voltage application electrode 24 is formed over an entire surface as a common electrode of all the detecting elements DU.

Returning to the description of FIG. 1, the charge-to-voltage converting amplifiers 3 amplify the voltages converted from the carriers. The analog-to-digital converter 4 converts analog values of the voltages into digital values, and stores them as pixel values in the image buffer memory 8 through the panel controller 5. The image buffer memory 8 stores as an image the pixel values arranged for respective pixels corresponding to the detecting elements Du. The image correcting unit 6 reads the image from the image buffer memory 8, and corrects the image read based on parameters for image corrections stored beforehand in the parameter memory 9.

A control sequence of the X-ray image pickup apparatus in this embodiment will now be described. X-rays to be detected are received in a state of a high-voltage (e.g. about several 100V-several 10 kV) bias voltage $V_A$ being applied to the voltage application electrode 24.

The incidence of X-rays generates carriers in the X-ray conversion layer 23, and the carriers are stored as charge information in the capacitors Ca through the carrier collecting electrodes 22. Target gate lines G are selected by scan signals (i.e. gate driving signals) of the gate drive circuit 1 for reading signals (the carriers here). Description will be made on the assumption that, in this embodiment, the gate lines G1, G2, G3, . . . , G9 and G10 are selected one at a time in the stated order. The scan signals for signal readout from the gate drive circuit 1 are signals for applying a voltage (e.g. about 15V) to the gate lines G.

The gate drive circuit 1 selects a target gate line G, and selects and designates each thin-film transistor Tr connected to the selected gate line G. Voltage is applied to, to turn ON, the gates of the thin-film transistors Tr selected and designated by this selection and designation. The carriers stored are read from the capacitors Ca connected to the thin-film transistors Tr selected and designated, to the data lines D via the thin-film transistors Tr selected and designated and shifted to the ON state. That is, the detecting elements DU relating to the selected gate line G are selected and designated, and the carriers stored in the capacitors Ca of the detecting elements DU selected and designated are read to the data lines D.

On the other hand, regarding the order of readout from the respective detecting elements DU relating to the same gate line G selected and designated, description will be made on the assumption that the readout is carried out by selecting one at a time in the order of data lines D1-D10. That is, the charge-to-voltage converting amplifiers 3 connected to the data lines D are reset, and the thin-film transistors Tr shift to the ON state (i.e. the gates are turned ON), whereby the carriers are read to the data lines D, which are amplified in the state of having been converted into voltages by the charge-to-voltage converting amplifiers 3.

That is, an address specification of each detecting element DU is made based on the scan signals for signal readout from the gate drive circuit 1, and selection of the charge-to-voltage converting amplifiers 3 connected to the data lines D.

First, the gate drive circuit 1 selects the gate line G1 and the detecting elements DU relating to the selected gate line G1 are selected and designated. The carriers stored in the capacitors Ca of the detecting elements DU selected and designated are read to the data lines D1-D10 in this order. Next, the gate drive circuit 1 selects the gate line G2, and the detecting elements DU relating to the selected gate line G2 are selected and designated in the same procedure. The carriers stored in the capacitors Ca of the detecting elements DU selected and designated are read to data lines D1-D10 in this order. The remaining gate lines G are selected similarly in order, to read two-dimensional carriers. The carriers read are amplified, respectively, in the state of having been converted into voltages by the charge-to-voltage converting amplifiers 3, and the analog values are converted into digital values by the analog-to-digital converter 4.

As noted hereinbefore, and as shown in FIGS. 1 and 2, outside the X-ray image pickup apparatus A1, there are an FPD power source A2 for driving the apparatus, and the control and image processing apparatus A3 acting as an external apparatus. The communicating unit 7 of the X-ray image pickup apparatus A1 and the communicating unit 11 of the control and image processing apparatus A3 are connected through an optical transmission device such as optical fiber F. Through such connection, the X-ray image pickup apparatus A1 is connected to be capable of communication to the control and image processing apparatus A3 which is an external apparatus. The control and image processing apparatus A3 has the communicating unit 11, an image processor 12 and a controller 13.

Figure 4:
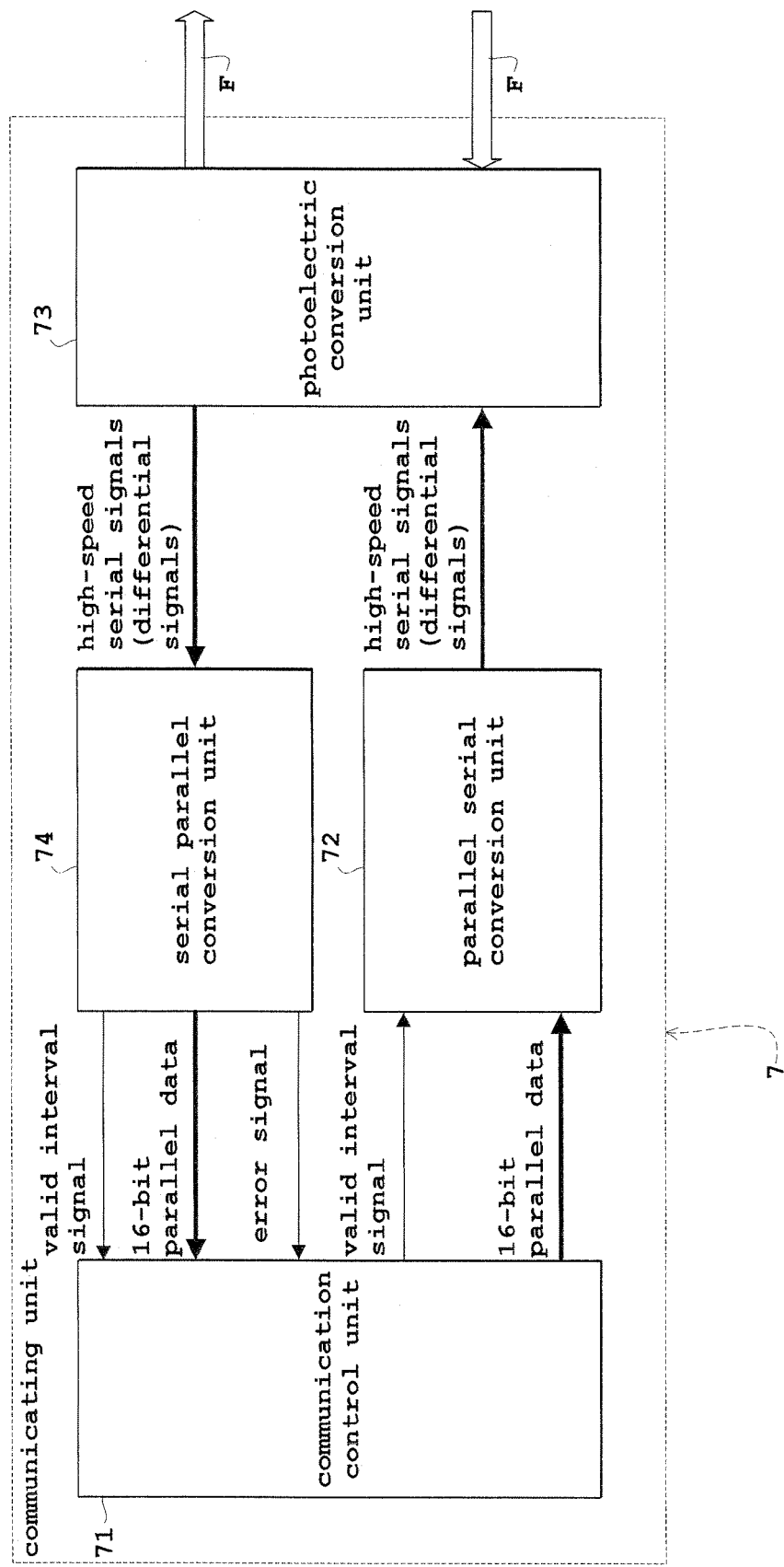
FIG. 4 is a schematic block diagram of a communicating unit of the X-ray image pickup apparatus.
Figure 5:
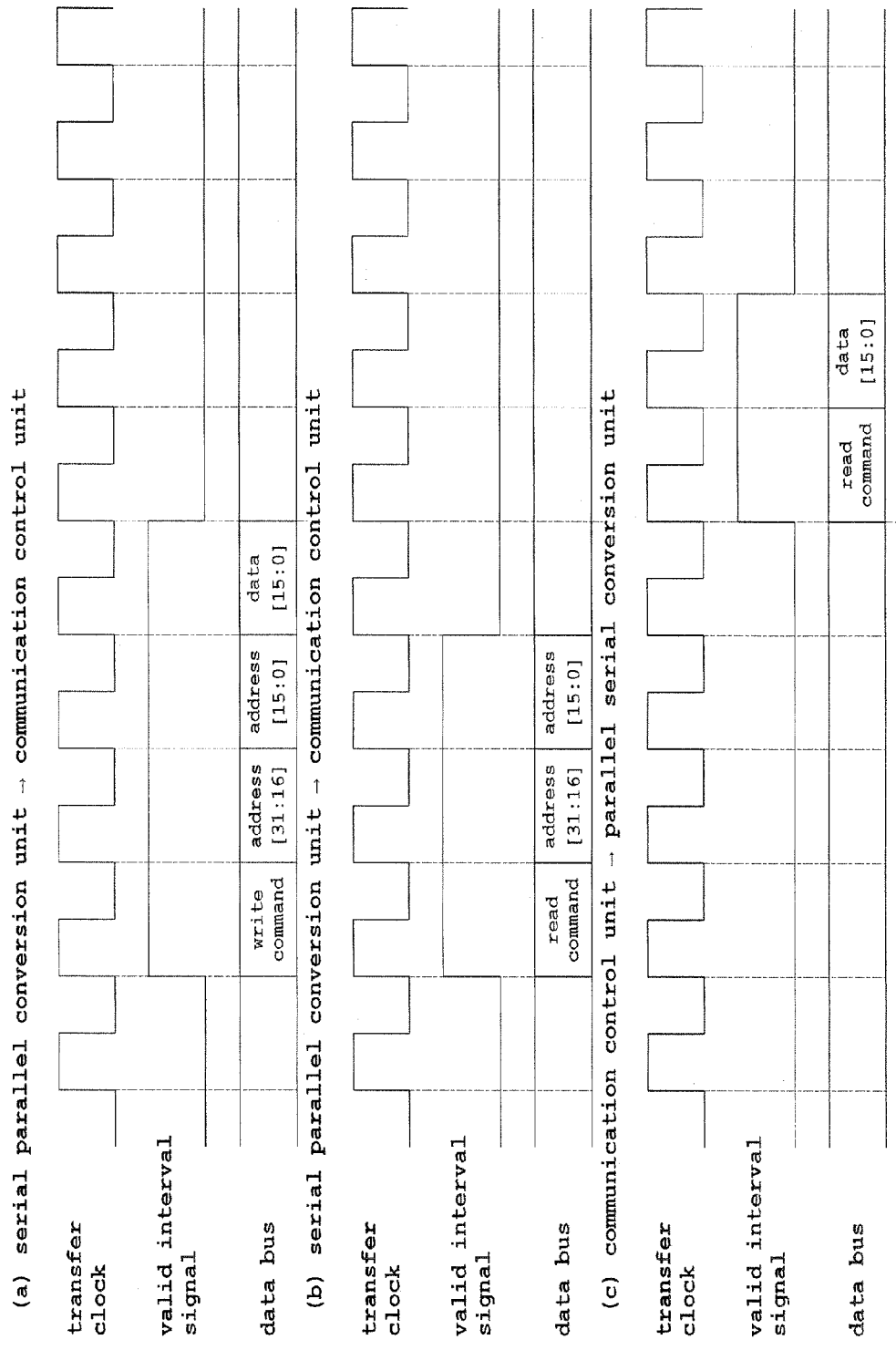
FIG. 5 (a) is a timing chart relating to data writing when data is transmitted from a serial parallel conversion unit to a communication control unit, (b) is a timing chart when data relating to readout is transmitted from the serial parallel conversion unit to the communication control unit, (c) is a timing chart relating to data readout when data is transmitted from the communication control unit to a parallel serial conversion unit.
Figure 6:
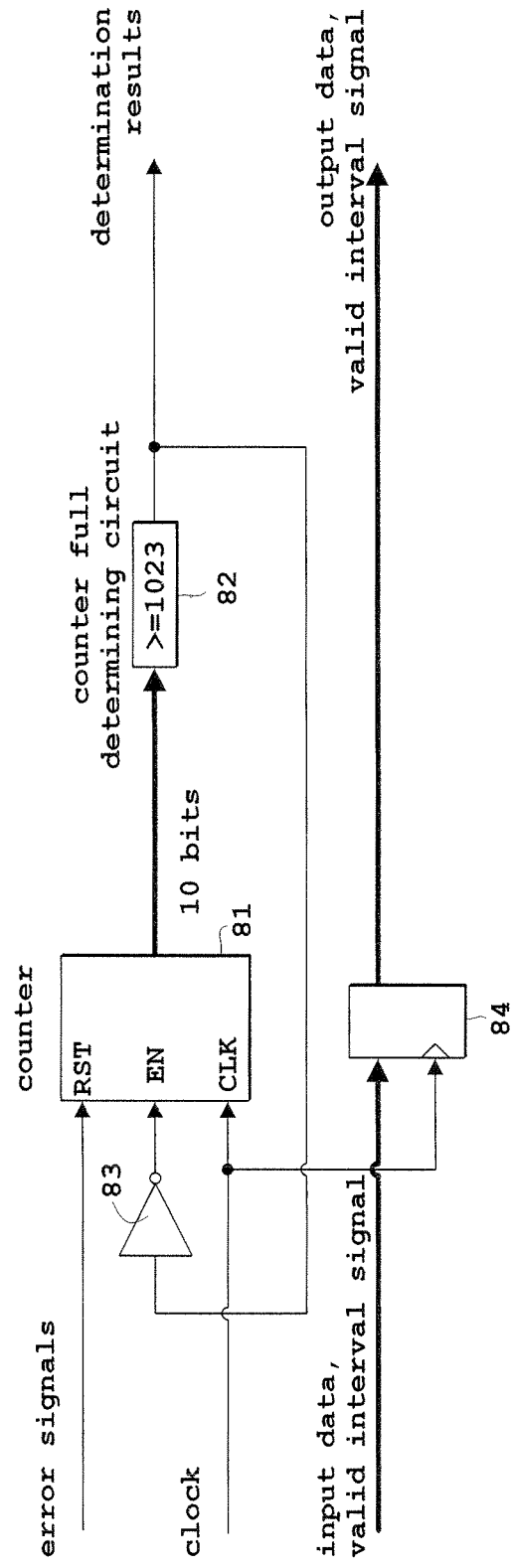
FIG. 6 is a logic circuit of an error detecting circuit for detecting past errors (error signals)
Figure 7:
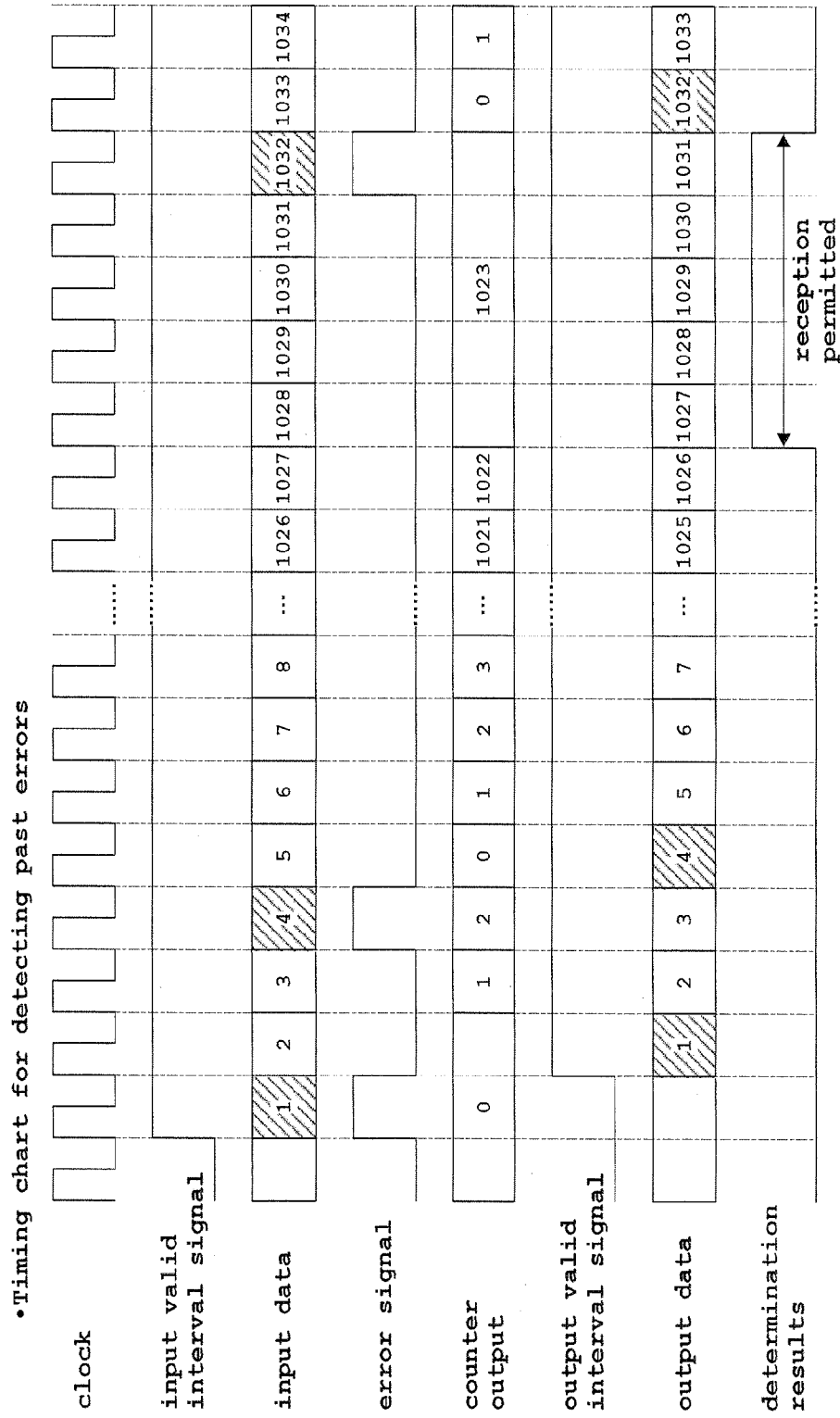
FIG. 7 is a timing chart for detecting the past errors.

Next, a characterizing portion around the communicating unit will be described with reference to FIGS. 4-9. FIG. 4 is a schematic block diagram of the communicating unit of the X-ray image pickup apparatus. FIG. 5 (a) is a timing chart relating to data writing when data is transmitted from a serial parallel conversion unit to a communication control unit. FIG. 5 (b) is a timing chart when data relating to readout is transmitted from the serial parallel conversion unit to the communication control unit. FIG. 5 (c) is a timing chart relating to data readout when data is transmitted from the communication control unit to a parallel serial conversion unit. FIG. 6 is a logic circuit of an error detection circuit when detecting past errors (error signals). FIG. 7 is a timing chart when detecting the past errors. FIG. 8 is a logic circuit of the error detection circuit when detecting errors (error signals) after a write access. FIG. 9 is a timing chart when detecting errors after the write access. As shown in FIG. 4, the communicating unit 7 of the X-ray image pickup apparatus A1 has a communication control unit 71, a parallel serial conversion unit 72, a photoelectric conversion unit 73 and a serial parallel conversion unit 74.

The communication control unit 71 and parallel serial conversion unit 72 are connected through a signal line having a bit number for simultaneous parallel transfer, and the communication control unit 71 and serial parallel conversion unit 74 are connected through a signal line having a bit number for simultaneous parallel transfer. Specifically, the signal line having the bit number for connecting the communication control unit 71 and parallel serial conversion unit 72 is a data bus for transfer of parallel signals, which transfers also a valid interval signal indicating valid intervals of the data bus, besides the parallel signals. Similarly, the signal line having the bit number for connecting the communication control unit 71 and serial parallel conversion unit 74 is also a data bus for transfer of parallel signals, which transfers also a valid interval signal indicating valid intervals of the data bus, besides the parallel signals. In FIG. 4, 16-bit parallel signals (16-bit parallel data) are transferred. Therefore, when transfer is made from the communication control unit 71 to the parallel serial conversion unit 72, 16-bit parallel signals (16-bit parallel data) are transferred in simultaneous parallel. Conversely, when transfer is made from the serial parallel conversion unit 74 to the communication control unit 71, similarly, 16-bit parallel signals (16-bit parallel data) are transferred in simultaneous parallel.

The communication control unit 71, when data is received from the image correcting unit 6 (see FIG. 1), makes the valid interval signal capable of transmission (enable), and transmits data in 16 bits each time to the parallel serial conversion unit 72. Conversely, the communication control unit 71, when the valid interval signal is capable of reception (enable), receives data in 16 bits each time from the serial parallel conversion unit 74, and transmits these data to the image correcting unit 6 and/or panel controller 5 (see FIG. 1). In FIGS. 5 (a)-5 (c), the valid interval signals are made capable of transmission and reception (enabled) by setting the voltage to High. Depending on signal mode, the valid interval signals may be made capable of transmission and reception (enabled) by setting the voltage to Low.

As shown in FIG. 5 (a), when the valid interval signal is enabled and the communication control unit 71 receives a command indicating write (which is written "write command" in FIG. 5 (a)), addresses and data (to be written) from the serial parallel conversion unit 74, the data is written at the designated addresses in the absence of an error signal to be described hereinafter. When updating a parameter for image correction, an address for storing the parameter is designated, and data of the parameter is written. As shown in FIG. 5 (b), when the valid interval signal is enabled and the communication control unit 71 receives a command indicating read (which is written "read command" in FIG. 5 (b)) and addresses from the serial parallel conversion unit 74, the designated addresses are read. As shown in FIG. 5 (c), enabling the valid interval signal, the communication control unit 71 transmits data (which is the target of readout) to the parallel serial conversion unit 72. Thus, the communication control unit 71 corresponds to the transmitting device in this invention, and corresponds also to the receiving device in this invention.

Returning to the description of FIG. 4, the parallel serial conversion unit 72 and photoelectric converter 73 are connected through one signal line, and the photoelectric converter 73 and serial parallel conversion unit 74 are connected through one signal line. Specifically, the one signal line connecting the parallel serial conversion unit 72 and photoelectric converter 73 is a data bus for differential signals (CML: Current Mode Logic). The one signal line connecting the photoelectric converter 73 and serial parallel conversion unit 74 is also a data bus for differential signals. As described also in the section "Means for Solving the Problem", differential signals are signals (also called "balance connection") made by dividing data into two signals, a signal of original data being allotted to one of the signals, and a signal of opposite phase having a reversed phase of the original data being allotted to the other signal. Where differential signals are employed, even if noise is superimposed on a signal, noise of opposite phase is superimposed in phase also on a signal of opposite phase, to cancel the noise components. Therefore, differential signals have an excellent noise-proof property. Differential signals are useful also for reducing amplitude of the signals to speed up rises and falls of the signals for the purpose of high-speed transfer, or when the voltage of signals lowers due to an extended cable.

The data bus for differential signals connecting the parallel serial conversion unit 72 and photoelectric converter 73, and also the data bus for differential signals connecting the photoelectric converter 73 and serial parallel conversion unit 74, are both data buses for transfer of serial signals, as distinct from the data bus for transfer of parallel signals. Thus, the parallel signals (including the transfer clock and valid interval signal) transferred from the communication control unit 71 to the parallel serial conversion unit 72 are converted into serial signals (written "high-speed serial signals (differential signals)" in FIG. 4) by the parallel serial conversion unit 72, to be transferred to the photoelectric converter 73. Conversely, serial signals (written "high-speed serial signals (differential signals)" in FIG. 4) transferred from the photoelectric converter 73 to the serial parallel conversion unit 74 are converted into the parallel signals (including the transfer clock and valid interval signal) by the serial parallel conversion unit 74, to be transferred to the communication control unit 71. Therefore, at a time of transfer from the parallel serial conversion unit 72 to the photoelectric converter 73, serial signals are transferred continuously one after another. Conversely, at a time of transfer from the photoelectric converter 73 to the serial parallel conversion unit 74, serial signals are likewise transferred continuously one after another.

In this embodiment, in order to maintain the communication quality of transfer of the 16-bit parallel data and valid interval signal, the parallel serial conversion unit 72 converts into the serial signals by serialization after converting into 20-bit parallel data based on the communication protocol. Conversely, the serial parallel conversion unit 74 reinstates to the 16-bit parallel data by removing the redundancy after parallelizing and converting the serial signals into 20-bit parallel data. The serial parallel conversion unit 74 has an error detecting function to detect an error for 20-bit parallel data violating the communication protocol, and it outputs an error signal at a time of violation of the communication protocol. The communication control unit 71 also has an error detecting function, and outputs an error signal upon detection of an error when an input not matching the protocol shown in FIGS. 5 (*a*)-5 (*c*) is received, or when a nonexistent address is designated. The communication control unit 71 and serial parallel conversion unit 74 correspond to the error detecting device in this invention.

Returning to the description of FIG. 4, the photoelectric converter 73 is connected to communicating unit 11 of the control and image processing apparatus A3 (see FIGS. 1 and 2) through optical fiber F. Specifically, the optical fiber F connecting the photoelectric converter 73 and the communicating unit 11 (see FIG. 1 and FIG. 2) of the control and image processing apparatus A3 (see FIGS. 1 and 2) includes optical fiber for transmission F as seen from the photoelectric converter 73, and optical fiber F for reception as seen from the photoelectric converter 73. The photoelectric converter 73 converts electric signals of the serial signals transferred from the parallel serial conversion unit 72 to the photoelectric converter 73 into light signals, and transfers them to the communicating unit 11 of the control and image processing apparatus A3 through the optical fiber F for transmission. Conversely, the photoelectric converter 73 converts light signals transferred from the communicating unit 11 of the control and image processing apparatus A3 through the optical fiber F for reception into electric signals of the serial signals, and transfers them to the serial parallel conversion unit 74.

The communication control unit 71, parallel serial conversion unit 72 and serial parallel conversion unit 74 noted above are formed of a programmable device (e.g. FPGA (Field Programmable Gate Array)) using internal hardware circuitry (e.g. logic circuitry) modifiable according to program data. An error detecting circuit for detecting past errors (error signals) is formed of a logic circuit as shown in FIG. 6. An error detecting circuit for detecting errors (error signals) after write access is formed of a logic circuit as shown in FIG. 8.

When access of a command indicating write (write command) as shown in FIG. 5 (*a*) (hereinafter referred to as "write access" for short) is made from the serial parallel conversion unit 74 to the communication control unit 71 (that is, when there is data received from the control and image processing apparatus A3), controls are carried out to effect the writing only when both the serial parallel conversion unit 74 and communication control unit 11 are errorless, when there was no error in a plurality of past cycles (e.g. 1023 cycles) of the write access, and when there is no error in a plurality of cycles (e.g. 16 cycles) after this write access. To summarize the above, only when no error is detected within a predetermined period (timing preceding in time being a plurality of past cycles, and that succeeding in time being a plurality of cycles after the write access) before and after receipt of the write access (data), by the receiving function of the communication control unit 71, from the control and image processing apparatus A3, the transmitting function of the communication control unit 71 performs controls to transmit and write the data received and temporarily stored in an FIFO 91 to be described hereinafter, to the external portion (e.g. addresses corresponding to the panel controller 5 and image correcting unit 6).

In detecting past errors (error signals), the timing chart is as shown in FIG. 7. It is assumed in FIG. 7 that, when input data is received in each cycle (one cycle of the clock signal) in the order of "1", "2", "3", ..., "1027", "1028", "1029", ..., error signals are received at the times of the input data being "1", "4", and "1032" (see hatching with diagonal lines extending to the upper right).

As shown in FIG. 6, the error detecting circuit for detecting past errors includes a counter 81, a counter full determining circuit 82, an NOT circuit (inverter: inverting circuit) 83 and a shift register circuit 84. The shift register circuit 84 is formed of a circuit such as a flip-flop circuit which can hold a past state.

Input data and a valid interval signal (in this case, an input valid interval signal) are outputted as output data and a valid interval signal (in this case, an output valid interval signal) through the shift register circuit 84, with a delay corresponding to one cycle. The counter 81 counts with the timing of an error signal inputted to the counter 81 as the starting point, and successively counts, unless an error signal is received, up to "1023" in the counter full determining circuit 82 ("10 bits" in FIG. 6 being the number of counts $2^{10}$ (=1024) from "0" to "1023"). Data outputted from the counter full determining circuit 82 is fed back to the counter 81 through the NOT circuit 83. When an error signal is received, the counter 81 is reset to "0".

In FIG. 7, when an error signal is received at a time of input data being "1" and an error signal is received at a time of input data being "4", the counter 81 counts one for each cycle sequentially from "0" with the timing of input data "1" as the starting point, and the counter 81 resets the count to "0", and counts one for each cycle sequentially from "0" with the timing of input data "4" as the starting point. And, in FIG. 7, after an error signal is received at the time of input data being "4", no error signal is received until input data reaches the time of "1032". Thus, the count is incremented one at a time, without being reset to "0". At the time the count reaches "1023", the counter 81 resets the count to "0" with the timing of the input being "1032" as the starting point, while the count is maintained at "1023". When the count is "1023", the determination result is outputted as a signal "reception permitted", which is a past error detection indicating that there has been no error in the 1023 cycles prior to the write access.

In detecting errors (error signals) after write access, the timing chart is as shown in FIG. 9. In the description of the embodiment, errors are detected for 16 cycles after write access. However, in order to simplify illustration, FIGS. 8 and 9 show a circuit and a timing chart for detecting errors for four cycles after write access. Therefore, FIG. 8 shows shift register circuits only of four stages, but actually 16 stages are provided in the case of 16 cycles. In FIG. 9, as in FIG. 7, it is assumed that, when input data is received in each cycle (one cycle of the clock signal) in the order of "1", "2", "3", . . . , "17", "18", . . . , error signals are received at the times of the input data being "1", "4", "11" and "17" (see hatching with diagonal lines extending to the upper right).

As shown in FIG. 8, the error detecting circuit for detecting errors after write access includes an FIFO (First In First Out) 91, a 4CLK delay circuit 92, shift register circuits 93, 94, 95 and 96 of four stages, an OR circuit 97 and an NOT circuit 98. The FIFO 91 is also called "first-in first-out memory", which is a memory where data are temporarily stored and read out in the order of entry (received). The shift register circuits 93, 94, 95 and 96, as is the shift register circuit 84, are formed of circuits such as flip-flop circuits which can hold past states. The FIFO 91 corresponds to the storage device in this invention.

Input data and an input valid interval signal are outputted as output data and an output valid interval signal from the FIFO 91 with a delay corresponding to 16 cycles (four cycles by the 4CLK delay circuit 92 in FIGS. 8 and 9). Error signals also are delayed by one cycle for each stage through the shift register circuits of 16 stages (shift register circuits 93, 94, 95 and 96 of four stages in FIG. 8), and are delayed 16 cycles (four cycles in FIG. 9) in the shift resist circuit of the final stage.

"Error signal delay 1" in FIG. 9 is a signal outputted from the shift register circuit 93 of the first stage, "error signal delay 2" is a signal outputted from the shift register circuit 94 of the second stage, "error signal delay 3" is a signal outputted from the shift register circuit 95 of the third stage, and "error signal delay 4" is a signal outputted from the shift register circuit 96 of the fourth stage. When any of error signal delays 1, 2, 3 and 4 held by the shift register circuits 93, 94, 95 and 96, including also the error signal, becomes High, the OR circuit 97 will output High. Only when error signal delays 1, 2, 3 and 4, including also the error signal, are all Low, the OR circuit 97 will output Low.

In FIG. 9, when an error signal is received at a time of input data being "1" and an error signal is received at a time of input data being "4", one or more of error signal delays 1, 2, 3 and 4, including also the error signal, is/are High with the input data being from "1" to "8". Thus, the OR circuit 97 outputs High, and the determination signal from the OR circuit 97 inverted through the NOT circuit 98 outputs Low. And, in FIG. 9, after an error signal is received at the time of input data being "4", no error signal is received until the time of input data being "11". Thus, error signal delays 1, 2, 3 and 4, including also the error signal, are all Low with the input data being from "9" to "10". The OR circuit 97 outputs Low, and the determination signal from the OR circuit 97 inverted through the NOT circuit 98 outputs High. The "reception permitted" is set to the times of input data being "9" to "10" (that is, the times of the determination signal being High), which is an error detection after write access indicating that there has been no error in the 16 cycles (four cycles in FIGS. 8 and 9) after write access.

Further, in FIG. 9, when an error signal is received at a time of input data being "11" and an error signal is received at a time of input data being "17", one or more of error signal delays 1, 2, 3 and 4, including also the error signal, is/are High with the input data being from "11" to "15". Thus, the OR circuit 97 outputs High, and the determination signal from the OR circuit 97 inverted through the NOT circuit 98 outputs Low. And, in FIG. 9, after an error signal is received at the time of input data being "11", no error signal is received until the time of input data being "17". Thus, error signal delays 1, 2, 3 and 4, including also the error signal, are all Low only with the input data being "16". The OR circuit 97 outputs Low, and the determination signal from the OR circuit 97 inverted through the NOT circuit 98 outputs High. The "reception permitted" is set to the time of input data being "16" (that is, the time of the determination signal being High), which is an error detection after write access indicating that there has been no error in the 16 cycles (four cycles in FIGS. 8 and 9) after write access.

When the connection of optical fiber F is lost, the output of the differential signals from the photoelectric converter 73 will become indefinite. When respective signals of non-inversion (signals of original data) and inversion of the differential signals become indefinite at the same electric level, logic level will often change irregularly (randomly) to High and Low. Therefore, 20-bit parallel data changes randomly in many cases. Thus, errors will easily occur when original data is reinstated by removing a redundancy from the data having the redundancy by converting 20-bit parallel data into 16 bits in the serial parallel conversion unit 74. Errors will easily occur also in the error detection by the communication control unit 71.

In order to output error signals by regarding such random variations as violation of the communication protocol, a table may be prepared beforehand which does not output error signals at a time of regular change pattern (communication protocol conditions), but outputs error signals at times of other change patterns (random change patterns). However, a write access may occur inadvertently, resulting in a data writing inadvertently, in spite of a random change pattern agreeing by chance with the regular change pattern (communication protocol conditions) prepared beforehand in the above table. Then, the possibility of such random change pattern agreeing by chance with the communications protocol conditions is reduced by taking measures of checking that communication has been made without any problem over a certain past period (a plurality of cycles in the past).

With these measures alone, a write access could inadvertently occur at the moment a cable represented by optical fiber F has begun to be extracted, thereby inadvertently causing a writing of data. Thus, the write access (or its timing) may be stored temporarily in a buffer, and the data may be written after confirming that an error will not occur for a while. This can prevent inadvertent data writing even when the optical fiber is plugged or unplugged.

According to the communicating unit 7 used in the X-ray image pickup apparatus A1 in this embodiment, the communication control unit 71 and serial parallel conversion unit 74 have an error detecting function to detect communication errors. The communicating unit 7 includes the FIFO 91 for temporarily storing data received from the control and image processing apparatus A3 by the receiving function of the communication control unit 71. Only when no error is detected within a predetermined period before and after receipt of write access (data), by the receiving function of the communication control unit 71, from the control and image processing apparatus A3, the transmitting function of the communication control unit 71 performs controls to transmit and write the data received and temporarily stored in the FIFO 91 to/in the external portion (e.g. addresses corresponding to the panel controller 5 and image correcting unit 6). Thus, when a cable is plugged or unplugged or the control and image processing apparatus A3 which is an external apparatus is rebooted, for example, the error detecting function detects this as a communication error. In such cases also, an inadvertent transmission, i.e. writing, to/in the external portion (addresses corresponding to the panel controller 5 and image correcting unit 6) of the data can be prevented. Therefore, a writing operation can be carried out without initialization and calibration, for example, also when there is no communication error (e.g. after communication is reinstated). As a result, even if a communication error occurs, an inadvertent writing of data is prevented, and working efficiency is improved.

In this embodiment, a communication error is detected when a redundancy is removed from the data having the redundancy to reinstate the original data, particularly at a time of plugging or unplugging of a cable. By using this, the error detecting device detects a communication error based on reinstatement of the original data done by removing the redundancy from the data having the redundancy.

In this embodiment, it is 20-bit data with the bit number 4 bits added to the bit number 16 bits of the original data without the redundancy. It is possible to give the redundancy to the data by adding the bit number 4 bits to the bit number 16 bits of the original data.

This embodiment employs differential signals. As noted hereinbefore, differential signals have an excellent noise-proof property. Differential signals are useful for reducing amplitude of the signals to speed up rises and falls of the signals for the purpose of high-speed transfer, or when the voltage of signals lowers due to an extended cable. On the other hand, the output of differential signals becomes indefinite when a cable represented by optical fiber is plugged or unplugged (particularly when the cable is detached). When respective signals of non-inversion (signals of original data) and inversion of the differential signals become indefinite at the same electric level, logic level will often change irregularly (randomly) to High and Low. Using such random changes, the error detecting function detects communication errors.

This invention is not limited to the foregoing embodiment, but may be modified as follows:

(1) The foregoing embodiment has been described taking the X-ray image pickup apparatus as an example of apparatus using the communication apparatus. This is not limitative, as long as it is a communication apparatus having a receiving device for receiving data from an external portion, and a transmitting device to for transmitting data to the external portion, as exemplified by radiographic apparatus using radiation other than X-rays. The external apparatus is not limited to the control and the image processing apparatus, either.

(2) In the foregoing embodiment, only when no error is detected within a predetermined period (timing preceding in time being a plurality of past cycles, and that succeeding in time being a plurality of cycles after write access in the embodiment) before and after receipt of write access (data), by the receiving device (the receiving function of the communication control unit 71 in the embodiment), from the external portion (the control and image processing apparatus A3 in the embodiment), the transmitting device in this invention (the transmitting function of the communication control unit 71 in the embodiment) performs controls to transmit and write the data received and temporarily stored in the storage device (FIFO 91 in the embodiment) to/in the external portion (the addresses corresponding to the panel controller 5 and image correcting unit 6 in the embodiment). Similar controls may be performed for a reading operation also. That is, only when no error is detected within a predetermined period before and after receipt of data, by the receiving function of the communication control unit 71, from the addresses corresponding to the panel controller 5 and image correcting unit 6 which are present outside, the transmitting device may perform controls to transmit and read the data (that is, the data which is the target of readout) received and temporarily stored in the storage device represented, for example, by the FIFO 91 to the control and image processing apparatus A3 which is an external apparatus. With such controls, when a cable is plugged or unplugged or the external apparatus is rebooted, for example, the error detecting device detects this as a communication error. In such cases also, an inadvertent transmission, i.e. reading, to the external portion (the control and image processing apparatus A3) of the data can be prevented. Therefore, a reading operation can be carried out without initialization and calibration, for example, also when there is no communication error (e.g. after communication is reinstated). As a result, even if a communication error occurs, an inadvertent reading of data is prevented, and working efficiency is improved.

The transmitting device may perform controls to transmit and write the data received and temporarily stored in the storage device to the external portion only when no error is detected within a predetermined period before and after receipt of data from the external portion by the receiving device. The transmitting device may also perform controls to transmit and read the data received and temporarily stored in the storage device to the external portion only when no error is detected within a predetermined period before and after receipt of data from the external portion by the receiving device. Thus, the controls may be performed for both the writing operation and reading operation.

(3) For the communicating unit of the external apparatus (the control and image processing apparatus in the embodiment) also, as in the foregoing embodiment, the transmitting device may perform controls to transmit and write the data received and temporarily stored in the storage device to/in the external portion only when no error is detected within a predetermined period before and after receipt of data from the external portion by the receiving device, or the transmitting device may perform controls to transmit and read the data received and temporarily stored in the storage device to the external portion only when no error is detected within a predetermined period before and after receipt of data from the external portion by the receiving device.

(4) In the foregoing embodiment, communication errors are detected based on received data. However, a construction may be adopted to detect errors by mechanically or electrically detecting attachment and detachment of connectors.

(5) The origin and destination of data may be the same. That is, only when no error is detected within a predetermined period before and after receipt of data from the external portion (e.g. the control and image processing apparatus A3) by the receiving device, the transmitting device may transmit the data received and temporarily stored in the storage device to the same external portion (the control and image processing apparatus A3). This applies also where the external portion is the address corresponding to the panel controller 5 or image correcting unit 6.

The invention claimed is:

1. A communication apparatus comprising: a receiving device for receiving data from an external portion, a transmitting device for transmitting data to the external portion, an error detecting device for detecting a communication error between the external portion and the receiving device or the transmitting device, and a storage device for temporarily storing the data received from the external portion by the receiving device, wherein the transmitting device only transmits the data received and temporarily stored in the storage device to the external portion when the error detecting device detects no communication error between the external portion and the receiving device or the transmitting device within a predetermined plurality of cycles before and a predetermined plurality of cycles alter a cycle in which the data is received from the external portion by the receiving device.

2. The communication apparatus according to claim 1, wherein the error detecting, device is arranged to detect the communication error when a redundancy is removed from the data received by the receiving device to reinstate original data from the external portion.

3. The communication apparatus according to claim 2, wherein the data having the redundancy is data with a bit number added to a bit number of the original data without the redundancy.

4. The communication apparatus according to claim 1, wherein the data comprises differential signals.

* * * * *